United States Patent Office 3,287,366
Patented Nov. 22, 1966

3,287,366
NOVEL 1,2-DIHYDRO-s-TRIAZINES
Howard Newman, Spring Valley, N.Y., and Edward Leslie Moon, Trenton, and Jackson Pollard English, Princeton, N.J., assignors to American Cyanamid Company, Stamford, Conn., a corporation of Maine
No Drawing. Filed Dec. 24, 1963, Ser. No. 333,185
5 Claims. (Cl. 260—249.9)

The present invention relates to novel dihydrotriazines, to methods for their preparation and has for its principal object the utilization of such dihydrotriazines as the active component of a herbicidal composition.

The novel dihydrotriazine compounds prepared in accordance with the present invention may be represented by the general formula:

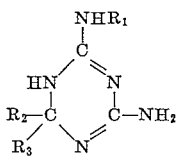

and acid addition salts thereof, wherein $R_1$ represents alkyl, alkoxy, aralkyl, nitro-substituted aralkyl, halo-substituted aralkyl or alkoxy-substituted aralkyl; $R_2$ represents alkyl or aryl, and $R_3$ represents hydrogen or alkyl.

In general, the compounds of the present invention may be prepared by a number of diverse processes. Illustrative of one such process is the reaction between (1) a mono-substituted biguanide and (2) an aldehyde or a ketone in the presence of an acidic material at elevated temperatures. Each reactant is advantageously present in equimolar amounts at temperatures ranging from about 110° C. to about 120° C.

It is an advantage of the present invention that a large number of monosubstituted biguanides or halides thereof may be employed. Illustrative thereof are: benzylbiguanide, benzylbiguanide hydrochloride, methylbiguanide hydrobromide, ethylbiguanide hydroiodide, propoxybiguanide hydrochloride, p-nitrobenzylbiguanide, and o-ethoxybenzylbiguanide.

Suitable ketones or aldehydes include, for instance: acetone, propionaldehyde, butyraldehyde, benzaldehyde, methylethylketone, acetaldehyde, and equivalents thereof. Insofar as the acidic material is concerned, this comprises any inorganic mineral acid, such as hydrochloric acid or hydrobromic acid.

Alternatively, the dihydrotriazines of the present invention can be prepared by the reaction between (a) the acid addition salts of alkylamines, aralkylamines or alkoxyamines, and (b) 1,2-dihydro-2,2-dialkyl-6-methyl-thio-s-triazine in an aqueous environment. Contemplated as a further alternative procedure is the base-catalyzed isomerization of 1-aralkyl-4,6-diamino-1,2-dihydro-s-triazines.

In general, the 6-methylthio-s-triazine reactant can be reacted in a straightforward manner with an amine addition salt by bringing into reactive combination approximately equimolar amounts of the reactants in an aqueous environment.

Such amines include, for instance: benzylamine hydrochloride, p-nitrobenzylamine hydrochloride, o-chloro-benzylamine hydrobromide.

In order to facilitate a further understanding of the present invention, the following examples are presented. These are not to be taken as limitative of the invention. Unless otherwise stated, all parts of solids are by weight and the parts of liquids are by volume.

*Example 1.—Peparation of 4-amino-6-benzylamino-1,2-dihydro-2,2-dimethyl-s-triazine hydrochloride*

In a suitable reaction vessel are added 2.27 parts of benzylbiguanide hydrochloride, 25 parts of absolute ethanol, 10 parts of acetone and 1 part of concentrated hydrochloric acid. The reaction mixture is held at 110° C. for twenty hours, cooled and the solvents are then evaporated. Residue is taken up in water, the solution neutralized with dilute sodium hydroxide and then treated with 10% sodium carbonate solution. The bicarbonate salt separates in 70% yield as a near-colorless solid. The latter is converted to the desired s-triazine compound having a melting point of from 190° C. to 194° C. by treatment with 10% hydrochloric acid. Filtration and drying are employed to recover the resultant 4-amino-6-benzylamino-1,2-dihydro-2,2-dimethyl-s-triazine hydrochloride.

The following analysis in percent is recorded: Calculated: C, 53.82; H, 6.77; N, 26.16; Cl, 13.24. Found: C, 53.40; H, 7.02; N, 26.09; Cl, 13.22.

*Example 2.—Preparation of 4-amino-6-benzylamino-1,2-dihydro-2,2-dimethyl-s-triazine bicarbonate*

A solution of 2 parts of 4-amino-1,2-dihydro-2,2-dimethyl-6-methylthio-s-triazine and 1.6 parts of benzylamine hydrochloride in 5 parts of water is heated under reflux for twenty-six hours. The aqueous solution is evaporated to dryness in vacuo and the gummy residue treated with dilute sodium carbonate solution. The resultant reaction mixture solidifies on standing. The solid bicarbonate derivative is next collected, heated in boiling acetone, filtered and dried. Resultant s-triazine bicarbonate possesses a melting point within the range of from 185° C. to 190° C.

Similarly, 4-amino-6-benzylamino-1,2-dihydro-2,2-dimethyl-s-triazine nitrate is prepared by employing a dilute sodium nitrate solution in lieu of the sodium bicarbonate solution in the procedure set forth above.

*Example 3*

Repeating the procedure of Example 2 in every detail, except that p-chlorobenzylamine hydrochloride, 3,4-dimethoxybenzylamine hydrochloride, methoxyamine hydrochloride, butylamine hydrochloride and dodecylamine hydrochloride, respectively, are employed in lieu of the benzylamine reactant and sodium bicarbonate is replaced by sodium nitrate, the following s-triazine nitrates are obtained in good yield and purity:

4-amino-6-p-chlorobenzylamino-1,2-dihydro-2,2-dimethyl-s-triazine nitrate (M.P.=151° C.–153° C.),
4-amino-6-(3,4-dimethoxybenzylamino)-1,2-dihydro-2,2-dimethyl-s-triazine nitrate (M.P.=163° C.–165° C.),
4-amino-6-methoxyamino-1,2-dihydro-2,2-dimethyl-s-triazine nitrate (M.P.=230° C.–232° C., as the hydrochloride salt),
4-amino-6-butylamino-1,2-dihydro-2,2-dimethyl-s-triazine nitrate (M.P.=127° C.–129° C.), and
4-amino-6-dodecylamino-1,2-dihydro-2,2-dimethyl-s-triazine nitrate (M.P.=90° C.–92° C.).

*Example 4.—Preparation of 4-amino-6-benzylamino-1,2-dihydro-2-phenyl-s-triazine hydrochloride*

1.0 part of 4,6-diamino-1-benzyl-1,2-dihydro-2-phenyl-s-triazine hydrochloride is dissolved in 40 parts of 50% aqueous methanol. The solution is brought to a pH of 11 with 4 N sodium hydroxide, heated on a steam bath for one hour, and chilled to 4° C. An oil separates and the supernatant liquid is decanted. The oil is dissolved in 4 parts of 50% aqueous ethanol and the pH of the solution is next adjusted to 6.5 with hydrochloric acid. Refrigeration for one week at 10° C. yields 0.475 part of 4-amino-6-benzylamino-1,2-dihydro-2-phenyl-s-triazine hydrochloride having a melting point range between 174° C. and 176° C.

In similar manner, 4-amino-6-(p-chlorobenzylamino)-1,2-dihydro-2-phenyl-s-triazine hydrochloride, having a melting point range between 196° C. and 198° C., and 4-amino-6-(3,4-dimethoxybenzylamino)-1,2-dihydro-2-phenyl-s-triazine, having a melting point range between 116° C. and 118° C., are prepared from the corresponding 4,6-diaminodihydrotriazines, namely, 4,6-diamino-1-p-chlorobenzyl-1,2-dihydro-2-phenyl-s-triazine and 4,6-diamino-1-(3,4-dimethoxybenzyl)-1,2-dihydro-2-phenyl-s-triazine.

*Example 5.—Preparation of N'-(3,4-dimethoxybenzyl)biguanide hydrochloride*

This example is illustrative of the preparation of a typical biguanide reactant.

17.2 parts of 3,4-dimethoxybenzylamine hydrochloride in 7.2 parts of dicyandiamide are fused at 175° C. for about thirty-five minutes. The reaction mass is cooled by slowly adding 150 parts of ethanol to the hot mixture and stirred until a solution is obtained. The warm alcoholic solution, upon cooling, yields 19.3 parts or 78 percent of fine white crystals having a melting point between 191° C. and 192° C.

*Example 6*

The compounds of the present invention are useful pre-emergence herbicides. This property is illustrated by the following examples wherein several compounds are tested for pre-emergence herbicidal activity against a number of species of plant seeds.

The compounds to be tested are dissolved in or dispersed in water and thoroughly mixed with potato dextrose agar. The agar containing 500 p.p.m. of compound is then poured into small jars to a depth of about one inch and permitted to solidify. When solidified, two corn kernels and three radish, wheat and cucumber seeds are placed on top of the agar in individual jars. The tests are replicated to assure an accurate determination of activity with each compound. All jars containing agar, seeds and test compound are then placed on tables and maintained at ambient temperature and relative humidity for three weeks. At the end of the holding period, all seeds are examined and rated according to the phytotoxicity key below:

0=normal; 9=seed dead; 8=plant dead; 7=roots dead; 6=blind germination; 5=germinate, grow, then die; 4=leaf malformation; 3=chlorosis; 2=suppressed growth; 1=elongated stems.

The results obtained in these tests are presented in the following table:

TABLE I

| Compound | Test Plant | | | |
|---|---|---|---|---|
| | Wheat | Radish | Cucumber | Corn |
| 4-amino-6-benzylamino-1,2-dihydro-2,2-dimethyl-s-triazine hydrochloride | 7 | 6 | 6 | 9 |
| 4-amino-6-(p-chlorobenzylamino)-1,2-dihydro-2,2-dimethyl-s-triazine nitrate | 9 | 5 | 5 | 9 |
| 4-amino-6-benzylamino-1,2-dihydro-2-phenyl-s-triazine hydrochloride | 7 | 5 | 5 | 9 |
| 4-amino-6-(p-chlorobenzylamino)-1,2-dihydro-2-phenyl-s-triazine hydrochloride | 7 | 9 | 9 | 5 |
| 4-amino-6-(3,4-dimethoxybenzylamino)-1,2-dihydro-2-phenyl-s-triazine hydrochloride | 0 | 6 | 5 | 9 |

*Example 7*

Following the procedure set forth in Example 6 above, test agars containing 100 p.p.m. and 10 p.p.m. of 4-amino-6-(p-chlorobenzylamino)-1,2-dihydro-2-phenyl-s-triazine hydrochloride are prepared and seeds of wheat, radish, cucumber and corn are placed thereon when the agar is solidified. After standing for three weeks, the seeds are examined and noted in accordance with the phytotoxicity key. The results obtained with the wheat, radish, cucumber and corn at 100 p.p.m. and 10 p.p.m., respectively, are: 6, 7; 6, 2; 6, 7; 6, 7; where these numbers represent the same values as in Table I above.

We claim:

1. The compound: 4-amino-6-benzylamino-1,2-dihydro-2,2-dimethyl-s-triazine hydrochloride.

2. The compound: 4-amino-6-(p-chlorobenzylamino)-1,2-dihydro-2,2-dimethyl-s-triazine nitrate.

3. The compound: 4-amino-6-benzylamino-1,2-dihydro-2-phenyl-s-triazine hydrochloride.

4. The compound: 4-amino-6-(p-chlorobenzylamino)-1,2-dihydro-2-phenyl-s-triazine hydrochloride.

5. The compound: 4-amino-6-(3,4-dimethoxybenzylamino)-1,2-dihydro-2-phenyl-s-triazine hydrochloride.

References Cited by the Examiner

UNITED STATES PATENTS

| 2,714,057 | 7/1955 | Chenicek | 260—249.9 XR |
| 2,909,420 | 10/1959 | Gysin et al. | 260—249.9 XR |
| 3,119,823 | 1/1964 | Shapiro et al. | 260—249.9 |

WALTER A. MODANCE, *Primary Examiner.*

J. M. FORD, *Assistant Examiner.*